J. G. HENDERSON.
BALL BEARING CONSTRUCTION FOR WORM GEAR AND OTHER PURPOSES.
APPLICATION FILED FEB. 19, 1920.
1,361,154. Patented Dec. 7, 1920.
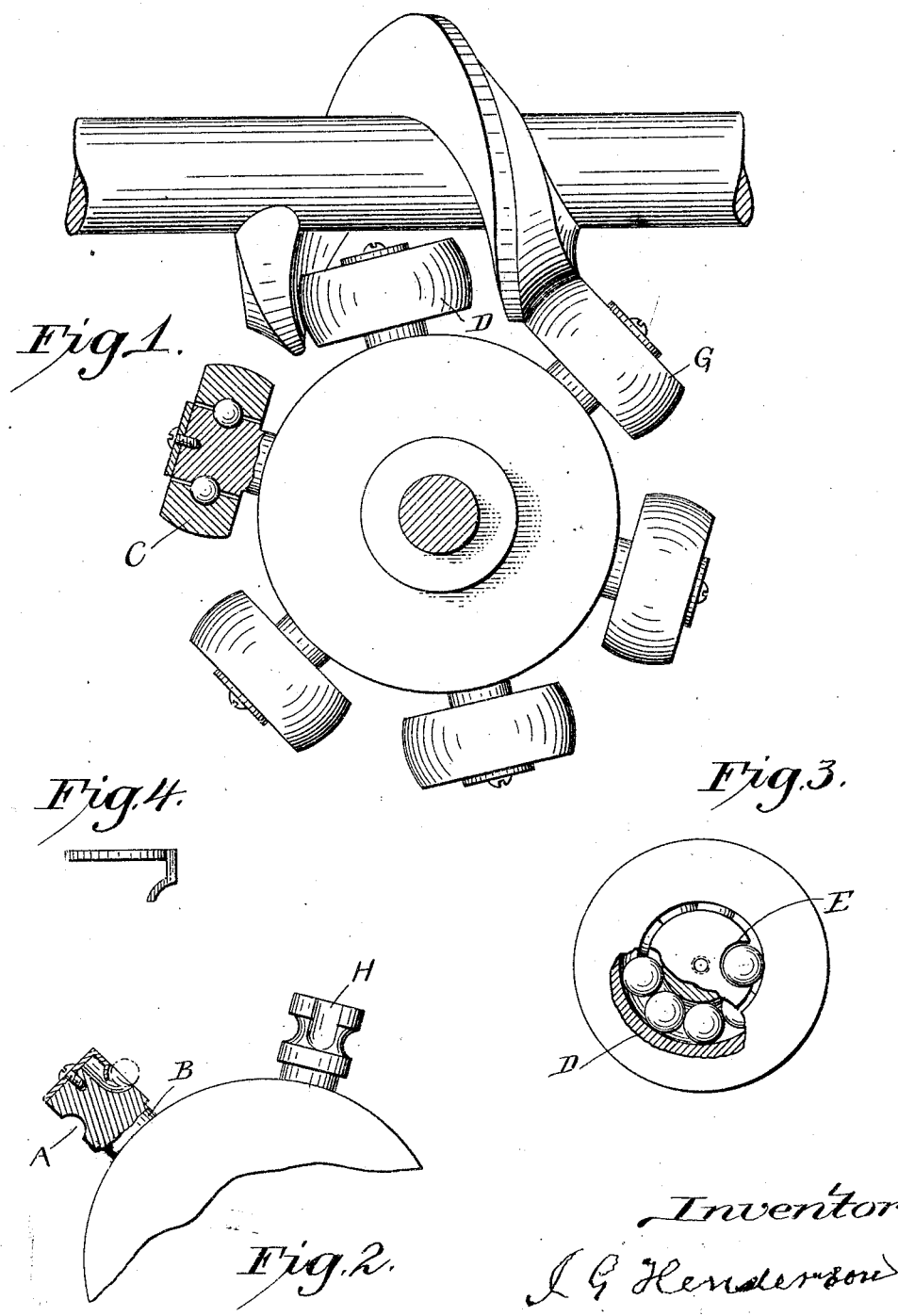

UNITED STATES PATENT OFFICE.

JOHN G. HENDERSON, OF CHARLOTTESVILLE, VIRGINIA.

BALL-BEARING CONSTRUCTION FOR WORM-GEAR AND OTHER PURPOSES.

1,361,154.  Specification of Letters Patent.  Patented Dec. 7, 1920.

Application filed February 19, 1920. Serial No. 359,780.

*To all whom it may concern:*

Be it known that I, JOHN G. HENDERSON, a citizen of the United States, residing at Charlottesville, Albemarle county, State of Virginia, have invented a new and useful Improvement in Ball-Bearing Construction for Worm-Gear and other Purposes.

With my improvement I am enabled to make a groove in the outer ring or disk and a deep groove in the inner ring or journal for a race-way and fill it with a solid row of balls, an achievement not heretofore attainable. To insert the balls, I make a groove in the journal or inner ring large enough to admit the balls at a point where there is no pressure on the balls and I make a bridge to carry the balls over this groove I place a series or radial journals on the periphery of the worm-wheel. I make a solid groove in these journals for a race-way for balls. I place on these journals a disk grooved internally, the same depth as the journals, completing the race-way. I fill this race-way with a solid row of balls, these disks mounted on these balls on these journals make the cogs of the worm-wheel. I make a groove in the side of these journals from the end of the journal to the race-way large enough to admit the balls. Through this groove I fill this race-way with a solid row of balls. This groove is placed on the side of the journal where there is no pressure on the balls. This is made possible by the fact that there is a point on every journal where there is no inward pressure on the balls. A removable bridge is placed over the groove to keep the balls from dropping into it, by which the balls can be removed and returned without disturbing any other part. The cogs thus constructed consist of a self-supported disk, mounted on a solid row of balls, the deep groove taking care of any side-pressure, presenting a smooth surface to the worm, and form a cheap, substantial and efficient rotatable cog for a worm-gear.

Referring to the drawings.

Figure 1 is a plan view of my invention, being partly shown in section.

Fig. 2 shows a disk cut internally through the center and grooved internally to complete the raceway for balls.

Fig. 3 shows the side of the disk, partly in section, showing a solid row of balls and the manner of their insertion.

Fig. 4 shows the removable bridge.

I do not confine my invention to worm-gear construction as my invention is equally applicable by enlarging the construction to wheels of vehicles, or any wheels, that revolve on journals, as any size of journal can be grooved for any size of balls, and the outer disk grooved to complete the raceway can be extended to form any kind of wheel, and the raceway can be filled with a solid row of balls thus forming a hub, capable of sustaining any amount of side pressure on the balls.

What I claim as my invention, and desire to secure by Letters Patent.

1. In a ball bearing for an anti-friction cog for worm gear, a stud shaft formed with a groove for permitting the insertion of balls into the raceway at a place on the inner raceway where there is no pressure on the balls, in combination with a removable cap on the journal having a tang extending into the groove under the raceway as and for the purpose described.

2. In a ball bearing cog for worm gear, a stud shaft formed with a groove for inserting balls in the raceway at a place on the inner raceway where there is no pressure on the balls, in combination with a removable cap on the journal with a tang extending into the groove substantially as described.

3. A series of radial stub shafts on the periphery of the worm gear, said stub shafts being grooved deeply for a raceway for balls; a disk internally grooved to complete the raceway on the sides of these shafts corresponding to the side of the worm gear where there is no inward pressure on the balls, a groove to insert the balls in combination with a removable cap on these shafts with a tang extending into the groove under the raceway as and for the purpose described.

JOHN G. HENDERSON.

Witnesses:
H. A. DINWIDDIE.
C. W. WATTS.